(12) United States Patent
Lutz et al.

(10) Patent No.: US 7,472,475 B2
(45) Date of Patent: Jan. 6, 2009

(54) SCREWING STATION

(75) Inventors: Werner Andreas Lutz, Kirchheim/Ries (DE); Herbert Müller, Heubach (DE)

(73) Assignee: Cooper Power Tools GmbH & Co., Westhausen (DE)

( * ) Notice: Subject to any disclaimer, the term of this patent is extended or adjusted under 35 U.S.C. 154(b) by 351 days.

(21) Appl. No.: 10/489,081

(22) PCT Filed: Sep. 5, 2002

(86) PCT No.: PCT/EP02/09950

§ 371 (c)(1),
(2), (4) Date: Sep. 23, 2004

(87) PCT Pub. No.: WO03/022513

PCT Pub. Date: Mar. 20, 2003

(65) Prior Publication Data

US 2005/0028648 A1    Feb. 10, 2005

(30) Foreign Application Priority Data

Sep. 5, 2001    (DE) .................... 201 14 662 U (51) Int. Cl.
*B23P 19/00* (2006.01)

(52) U.S. Cl. .................. 29/791; 29/795; 81/57.22; 81/484; 483/32

(58) Field of Classification Search ............... 29/791, 29/795, 33 K; 83/57.22, 57.36, 484; 483/32, 483/38, 51, 56; 81/484
See application file for complete search history.

(56) References Cited

U.S. PATENT DOCUMENTS

| | | | |
|---|---|---|---|
| 710,676 A * | 10/1902 | Finn .......................... | 81/57.36 |
| 1,619,255 A * | 3/1927 | Haynes ..................... | 81/185 |
| 2,069,882 A * | 2/1937 | Hall ......................... | 81/467 |
| 2,651,228 A * | 9/1953 | Taylor ...................... | 81/57.36 |
| 2,691,314 A * | 10/1954 | Stevens et al. ............. | 81/470 |
| 2,720,803 A * | 10/1955 | Rice et al. ................. | 81/470 |
| 2,732,050 A * | 1/1956 | Van Sittert ............... | 192/56.54 |
| 2,742,807 A * | 4/1956 | Ferm et al. ................ | 81/57.36 |
| 2,973,021 A * | 2/1961 | Crossen .................... | 81/430 |
| 2,978,936 A * | 4/1961 | Orner ....................... | 81/475 |

(Continued)

FOREIGN PATENT DOCUMENTS

DE    2847364 A * 5/1980

(Continued)

*Primary Examiner*—Essama Omgba
(74) *Attorney, Agent, or Firm*—King & Spalding LLP (57) ABSTRACT

A screwing station, in particular along an assembly line, comprises at least one machine frame and a screwing tool adjustably supported relative thereto between at least one retracted and one operative position and connected to a supply and, optionally, a measuring line. To improve a screwing station of this type in such a way that less mass has to be moved while the screwing station is of a simple construction, so that wear, maintenance work and energy consumption are reduced and a concurrent movement of supply and measuring lines is prevented at the same time, which might otherwise result in damage to the lines, the screwing tool comprises a drive shaft supported on the machine frame and a wrench head telescopically displaceable relative to said shaft, the drive shaft and wrench head being drivingly connected and the wrench head being movable by means of a lifting and lowering means between retracted and operative position.

39 Claims, 4 Drawing Sheets

U.S. PATENT DOCUMENTS

| | | | | |
|---|---|---|---|---|
| 3,227,015 | A * | 1/1966 | Tremblay | 81/177.2 |
| 3,319,494 | A * | 5/1967 | Ulbing | 475/12 |
| 3,336,611 | A * | 8/1967 | Schepp | 7/158 |
| 3,731,362 | A * | 5/1973 | Carminati | 29/240 |
| 3,757,613 | A * | 9/1973 | Arndt et al. | 81/57.22 |
| 3,858,286 | A * | 1/1975 | Nohejl | 483/32 |
| 3,965,778 | A * | 6/1976 | Aspers et al. | 81/470 |
| 4,376,397 | A * | 3/1983 | Newby et al. | 81/177.2 |
| 4,417,488 | A * | 11/1983 | Gentry | 81/185 |
| 4,542,576 | A * | 9/1985 | Yamanaga et al. | 483/32 |
| 4,581,812 | A * | 4/1986 | Yamanaga et al. | 483/32 |
| 4,674,181 | A | 6/1987 | Hamada et al. | |
| 4,905,548 | A * | 3/1990 | Colace et al. | 81/177.2 |
| 4,964,497 | A | 10/1990 | Bundo et al. | |
| 4,977,667 | A * | 12/1990 | Sekimoto et al. | 29/784 |
| 5,123,309 | A * | 6/1992 | Moceri | 81/57.31 |
| 5,229,931 | A * | 7/1993 | Takeshima et al. | 700/4 |
| 5,251,520 | A * | 10/1993 | Lanham | 81/436 |
| 5,277,085 | A * | 1/1994 | Tanimura et al. | 81/57.22 |
| 5,319,845 | A | 6/1994 | Watanabe et al. | |
| 5,542,899 | A * | 8/1996 | Yamada et al. | 483/32 |
| 5,692,418 | A * | 12/1997 | Burner | 81/54 |
| 5,848,458 | A | 12/1998 | Bullen | |
| 5,862,904 | A * | 1/1999 | Tominaga | 198/341.03 |
| 5,920,974 | A | 7/1999 | Bullen | |
| 5,974,919 | A * | 11/1999 | Habele | 81/470 |
| 5,993,364 | A | 11/1999 | Matsuura et al. | |
| 6,098,269 | A | 8/2000 | Albus et al. | |
| 6,105,475 | A * | 8/2000 | Ohmi et al. | 81/469 |
| 6,193,049 | B1 | 2/2001 | Noda | |
| 6,245,284 | B1 | 6/2001 | Cooper | |
| 6,419,071 | B1 | 7/2002 | Oldford et al. | |
| 6,490,761 | B2 * | 12/2002 | Durrant | 16/436 |
| 6,619,159 | B2 * | 9/2003 | Galat | 81/57.13 |
| 6,719,122 | B2 | 4/2004 | Oldford et al. | |
| 6,827,197 | B2 | 12/2004 | Oldford et al. | |
| 6,834,567 | B2 * | 12/2004 | Rosetto | 81/57.22 |
| 6,877,403 | B2 * | 4/2005 | Hsien | 81/124.5 |
| 6,886,241 | B2 | 5/2005 | Tachibana et al. | |
| 6,918,322 | B1 * | 7/2005 | Biller | 81/57.22 |
| 7,055,408 | B2 * | 6/2006 | Sasaki | 81/54 |
| 7,197,810 | B2 * | 4/2007 | Lutz et al. | 29/564.1 |
| 2002/0189085 | A1 | 12/2002 | Menzio | |
| 2003/0116407 | A1 | 6/2003 | Takano et al. | |
| 2005/0188527 | A1 * | 9/2005 | Lutz et al. | 29/564.1 |
| 2005/0257361 | A1 | 11/2005 | Ramnauth et al. | |

FOREIGN PATENT DOCUMENTS

| | | | |
|---|---|---|---|
| DE | 2848903 | A * | 5/1980 |
| JP | 58051029 | A * | 3/1983 |
| JP | 04289035 | A * | 10/1992 |

* cited by examiner

SCREWING STATION

CROSS REFERENCE TO RELATED APPLICATIONS

This is a U.S. National Phase of PCT Application PCT/EP02/09950, filed 5 Sep. 2002, which claims priority from German application 20114662.2, filed 5 Sep. 2001, incorporated herein by reference.

BACKGROUND OF THE INVENTION

The present invention relates to a screwing station, in particular along an assembly line, comprising at least one machine frame and a screwing tool adjustably supported relative thereto between at least one retracted and one operative position and connected to a supply and, optionally, a measuring line.

Such screwing stations are e.g. arranged along assembly lines in car manufacturing. They serve to assemble engines, gears, or the like. The screwing station comprises a machine frame which is arranged next to the assembly line or is part of the assembly line. The machine frame has arranged thereon the standard means of a screwing station, e.g. base carrier, holding carrier, control cabinet, control panel, and the like. Furthermore, for transporting the workpieces to be screwed, the machine frame has assigned thereto a transportation means for the workpieces to be screwed, e.g. a workpiece carrier that is movable along rails, a slide, a transportation belt, or the like. With these transportation means, the corresponding workpiece is moved into its assembly position relative to the screwing station and worked in said position by means of the screwing tool. After the workpiece has been properly arranged, the screwing tool is moved from its retracted position into its operative position in which it screws e.g. appropriate screw bolts on the workpiece.

The screwing tool is connected at least to a supply line via which, depending on the configuration of the screwing tool, an electrical, pneumatic, hydraulic or other supply takes place for driving the screwing tool. Furthermore, it is possible that the screwing tool is connected to a corresponding measuring line via which e.g. pickups are connected on the screwing tool to an associated evaluation means. Such pickups may be a speed pickup, a torque pickup, or the like.

In a screwing station already known from practice, the screwing tool, preferably a plurality of such screwing tools, are moved as a whole relative to the machine frame between retracted position and operative position. The supply lines and measuring lines are thus also moved. The mass to be moved on the whole is relatively large. Furthermore, a complicated drive is needed for moving e.g. a slide on which all of the screwing tools are mounted. As a consequence, wear and maintenance work as well as energy consumption are relatively high.

BRIEF SUMMARY OF THE INVENTION

It is therefore the object of the present invention to improve a screwing station of the above-mentioned type in such a way that less mass has to be moved while the screwing station is of a simple construction, so that wear, maintenance work and energy consumption are reduced. At the same time, a concurrent movement of supply and measuring lines shall be prevented, which might otherwise result in damage to the lines.

In connection with the features of the preamble of claim 1, this object is achieved in that the screwing tool comprises a drive shaft supported on the machine frame and a wrench head telescopically displaceable relative to said shaft, the drive shaft and wrench head being drivingly connected and the wrench head being movable by means of a lifting and lowering means between the retracted and the operative position.

According to the invention, it is only the wrench head that is still moved, whereas the remaining parts of the screwing tool are stationarily arranged on the machine frame. The mass to be moved is thereby reduced considerably. This helps to save energy. Furthermore, a drive for displacing the screwing tool is on the whole not needed. Thanks to the simple construction of the screwing tool, wear and maintenance work are also reduced. The supply lines and measuring lines are not moved along, so that damage to said lines is virtually ruled out.

Moreover, the simplified and maintenance-free construction of the screwing station according to the invention considerably helps to save costs in comparison with the screwing station known from practice.

It is true that it is possible to move each screwing tool as such by means of a corresponding lifting and lowering means between retracted and operative position. However, in order to further simplify the construction, and since normally more than one screwing tool is needed for a corresponding workpiece, the lifting and lowering means may be assigned to a number of screwing tools for the simultaneous movement thereof. For instance, four, five, six or even more screwing tools are simultaneously movable in this way, said screwing tools being also simultaneously usable for screwing.

The lifting and lowering means may be configured in different ways. One example is a slide which is movably supported along corresponding guides on the machine frame. The corresponding screwing tools may project from said guide slide. To give the lifting and lowering means a simple design and to make it easily accessible, said means may be a guide plate which is adjustably supported on the machine frame between a lifted and a lowered position. Said guide plate has at least supported thereon the wrench heads of the corresponding screwing tools, said heads being telescopically adjusted by the movement of the guide plate relative to the associated drive shafts.

Various drive means for adjusting the guide plate are possible. For instance, the plate may be adjustable by an electric motor and a corresponding gear. A further possibility of adjusting the guide plate may be that the lifting and lowering means comprises at least one piston-cylinder adjustment unit arranged between machine frame and guide plate. The adjustment unit may be operable pneumatically or hydraulically. The guide plate is adjusted relative to the machine frame by extending or retracting the piston of the adjustment unit accordingly.

To guide the guide plate not only with the help of the piston-cylinder adjustment unit, at least one guide means may be arranged between guide plate and machine frame. The guidance of the guide plate may thereby be decoupled from a drive for moving the guide plate.

Since the guide plate is normally moved along a straight line between lifted and lowered position, the guide means may comprise e.g. at least one guide piston by which the guide plate is guided.

It is here possible that the guide piston projects from the machine frame and the guide plate slides along the piston. However, the guide piston may also be detachably secured with one end to the guide plate and may be supported in a longitudinally displaceable manner on the machine frame, in particular, in a guide sleeve.

For screwing purposes the wrench head must comprise a correspondingly rotatable part, such as a screwing spindle. The spindle may be rotatably supported in a housing which is held by the guide plate and moved therewith. However, to make the construction even more simple, the wrench head may be directly designed as a screwing spindle and rotatably supported in the guide plate.

To permit, if necessary, a certain relative movement between the guide plate and the wrench head when the guide plate is being displaced, the wrench head may be displaceably supported relative to the guide plate substantially in the longitudinal direction of the wrench head. It is e.g. prevented thereby that the guide plate must be tracked along upon tightening of a screw connection or that during movement of the guide plate into the lowered position the wrench heads are damaged upon contact with the workpiece. Instead of this, the wrench head will recede upon contact with the workpiece and move relative to the guide plate.

To support the wrench head in a safe way, said head may be rotatably supported in a double bearing arrangement of the guide plate and partly displaceably supported in longitudinal direction.

To permit a resetting into an initial position relative to the guide plate in an easy way when the wrench head is longitudinally displaceable, the wrench head may be spring-biased towards the operative position. When the wrench head is displaced relative to the guide plate e.g. by contact with the workpiece, it will be returned by the spring bias automatically into its initial position relative to the guide plate as soon as it is no longer in contact with the workpiece.

A simple technical realization of such a spring load can be seen in the feature that a spring element is arranged substantially between socket wrench at the free work end of the wrench head and bottom side of the guide plate.

To mount the spring element in an easy way on the wrench head, it may be arranged between two stop rings attached onto the wrench head. A lower stop ring may be assigned to the socket wrench and an upper stop ring substantially to the bottom side of the guide plate and be supported thereon.

To be able to adapt the screwing station in an easy way to different screwing processes, the socket wrench may be detachably secured to the work end of the wrench head. It is here also possible to vary the number and arrangement of the screwing tools in response to the screwing action.

To be able to establish the telescopic connection between drive shaft and wrench head in an easy way, the wrench head may comprise a substantially tubular wrench head housing with inner hole which is engaged in telescopically displaceable fashion by the drive shaft. Upon adjustment of the wrench head between retracted position and operative position, the drive shaft will move accordingly within the inner hole. Of course, it would also be possible that the drive shaft has a corresponding inner hole which is engaged by the wrench head in telescopically displaceable fashion.

To establish a rotationally fixed connection between wrench head housing and drive shaft in a simple way, the wrench head housing may be provided substantially at its insertion end facing the drive shaft with a driving means for the rotationally fixed connection of wrench head and drive shaft. As soon as the drive shaft is in engagement with the driving means, the rotationally fixed connection is established. The driving means may be designed such that the rotationally fixed connection exists e.g. only along a specific partial length of the wrench head between retracted position and operative position. However, it is also possible that the rotationally fixed connection is realized along the whole path between retracted position and operative position.

Such a driving means may e.g. be formed by a toothed or splined shaft connection. For high alternating or pulsing torque loads, the driving means may e.g. have an internal toothing, in particular an internal spline toothing, which is engaged by a corresponding external toothing on the drive shaft.

The driving means may be made intregral with the wrench head housing by the measure that the internal toothing is directly formed in at least a portion of the inner hole of the wrench head housing. To be able to replace the driving means easily in case of possible wear, the means may be a detachable part of the wrench head housing.

To be able to interconnect driving means and wrench head housing securely in a rotationally fixed fashion, the driving means may be designed as a driving flange with claw connection. Said claw connection yields a rotationally rigid, non-shiftable coupling between driving flange and wrench head housing.

For establishing a corresponding claw connection, use is made of at least three claws, the wrench head housing comprising corresponding complementary claw receiving means. However, it is also possible that less than three claws and claw receiving means are used.

To be able to replace the drive shaft with simultaneous assignment to a corresponding drive means, such a drive shaft may be motion-connected at its drive end facing away from the wrench head housing to a drive means on the machine frame. The motion connection may e.g. be established via a corresponding coupling connection that can be established rapidly.

A possibility regarding the motion connection between drive shaft and drive means can be realized in that a shell set with spacer sleeve is attached onto the drive end of the drive shaft.

To guide the guide plate in addition to the guide pistons between lifted and lowered position or also alternatively with respect to the guide pistons, the guide plate may be guided on the machine frame in guides. An example of such a guide are corresponding rails, or the like.

To prevent the guide plate from possibly moving beyond the lifted and/or lowered position, the guide plate may have assigned thereto a limit position means. Said means may be designed as a limit switch, limit stop, or the like.

As an alternative or in addition to the piston-cylinder adjustment unit, an adjustment drive with ball roll spindle and electric motor may be assigned to the guide plate in connection with the rail-like guides. Further possibilities are a direct electric drive, a belt drive, or the like.

To prevent a displacement of the guide plate by its own weight into the lowered position, e.g., in case of failure of the drive means for adjusting the guide plate, the guide plate may have assigned thereto a locking means at least for locking into the lifted position.

Said corresponding locking means may here be designed as a clamping means which e.g. clamps the piston of the piston-cylinder adjustment unit into a corresponding position, or also the guide piston. It is also possible that the locking means directly acts on guide rails or other guides of the guide plate.

To determine a position of the guide plate and thus also of the screwing tools during operation of the screwing station and to record said position, if necessary, the piston-cylinder adjustment unit and/or the guide piston may comprise a query means. A corresponding query means may also be assigned to an electrical drive for the guide plate.

BRIEF DESCRIPTION OF THE SEVERAL VIEWS OF THE DRAWINGS

Advantageous embodiments of the invention shall now be explained in the following with reference to the figures attached to the drawing, in which.

DETAILED DESCRIPTION OF THE INVENTION

Figure 1:
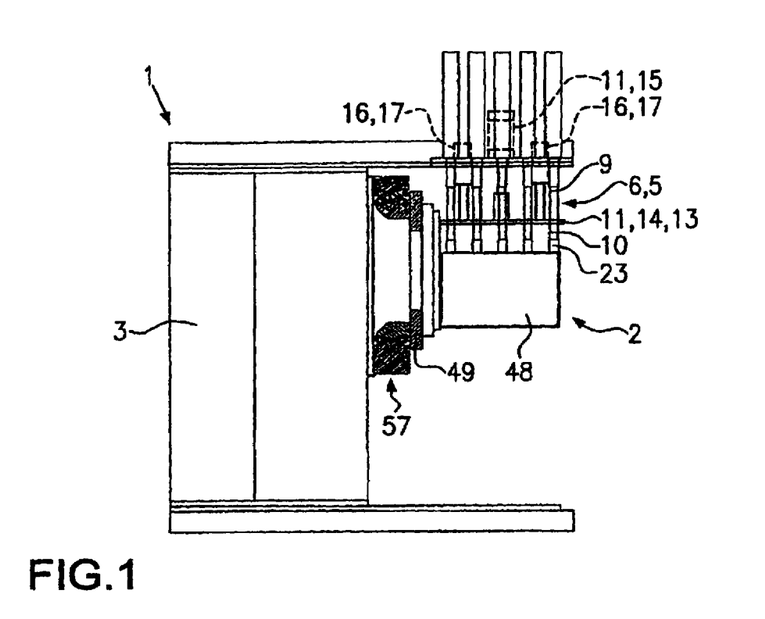
FIG. 1 is a side view of an embodiment of a screwing station according to the invention.

FIG. 1 is a side view of a screwing station 1 according to the invention. Said station comprises a machine frame 3 by which a number of screwing tools 6 are held. The machine frame 3 comprises upper and lower carriers having arranged therein-between an assembly line 2. Various workpieces 48, such as engine block, gear block, or the like, can be transported along said assembly line. A workpiece carrier 49 which is movable along a workpiece carrier guide 57 serves the purpose of transportation. The workpiece carrier guide 57 is secured to the machine frame 3 in the illustrated embodiment. There is also the possibility that the workpiece carrier guide 57 is formed by a transportation belt or other guides extending past the screwing station 1 and independently of said station.

The screwing tools 6 are shown in FIG. 1 in their operative position 5. In said position, socket wrenches 23 at ends of wrench heads 10 of the screwing tools 6 are in engagement with screw bolts, nuts or other connection members to be tightened. The wrench head 10 forms the screwing tool 6 together with a drive shaft 9, the drive shaft 9 being motion-connected to a corresponding drive means; see the following figures. Wrench head 10 and drive shaft 9 are telescopic.

The wrench heads 10 are passed through a guide plate 14 as part of a lifting and lowering means 11 and at least rotatably supported in said plate. The guide plate 14 is arranged in its lowered position 14 so that the socket wrenches 23 are in contact with the screw-in means.

Figure 2:
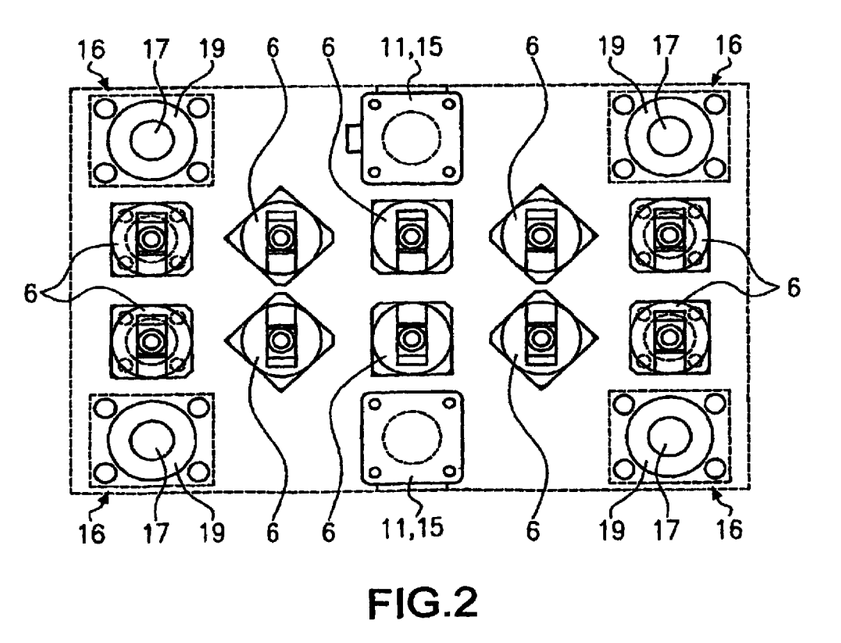
FIG. 2 is a top view on part of the screwing station according to FIG. 1.

FIG. 2 is a top view on the screwing station 1 according to FIG. 1, in particular in the area above the guide plate 14. This top view shows a substantially rectangular section in which a number of guide means 16, lifting and lowering means 11 and a total of ten screwing tools 6 are arranged. The screwing tools are arranged in two rows, each including five screwing tools, the rows being arranged in parallel with each other and the screwing tools being equidistant. Each of the four corners of the illustrated section shows one of the guide means 16. Said guide means is formed by a guide sleeve 19 secured to the machine frame 3 and by a guide piston 17 supported therein in longitudinally displaceable fashion. The guide pistons 17 of the various guide means 16 project in the direction of the guide plate 14 (see also FIGS. 1 and 3) from the machine frame 3.

A respective lifting and lowering means 11 is arranged approximately centrally between two guide means 16. Said means 11 is formed by a piston-cylinder adjustment unit 15. A corresponding piston of said adjustment unit extends from the machine frame 3 towards the guide plate 14 and is detachably secured there. This applies by analogy to guide piston 17.

Figure 3:
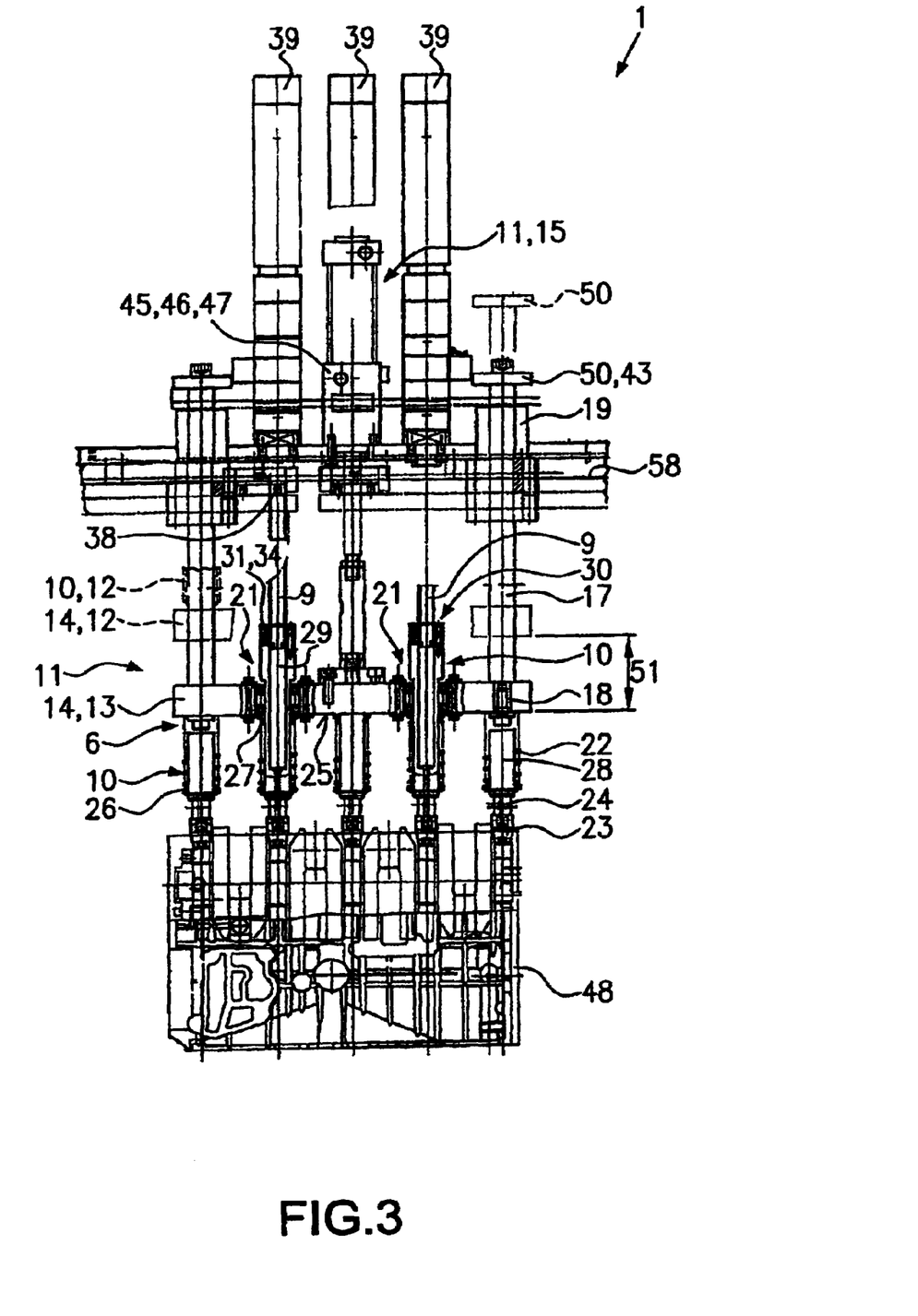
FIG. 3 is a front view partly showing a further embodiment of a screwing station.

FIG. 3 is a front view partly showing a further embodiment of a screwing station 1. Identical parts are provided with identical reference numerals in this figure and also in the remaining figures and are partly only explained in connection with one figure.

Embodiment 3 differs from that of FIG. 1 especially by the feature that the workpiece 48 is transported via a separate conveying means, such as a transportation belt, workpiece carrier, or the like. Underneath a transverse carrier 58 of the machine frame 3 (see also FIG. 1), the guide plate 14 is shown in its lowered position 13 and in broken line in its lifted position 12, resulting in a lift 51 between said two locations or positions. By analogy with FIG. 2, a total of two rows is shown, each including five screwing tools 6 with four guide means 16 and two centrally arranged lifting and lowering means 11. For receiving feedback as to the position of the guide plate 14, the lifting and lowering means 11 has assigned thereto a query means 47. The relative position between piston and cylinder can be detected through said means. Furthermore, a clamping means 46 is assigned for securing the lifted position 12 of the guide plate 14 by detachable clamping of the cylinder. The clamping means 46 is an embodiment of such a locking means 45.

The guide means 16 comprise the guide sleeves 19 which are secured to the transverse carrier 58. The corresponding guide pistons 17 extend through the guide sleeves 19. The guide pistons are provided at their upper end 50 with a limit position means 43. The latter defines a maximum lowered position 13 of the guide plate 14. The limit position means 43 is formed in the simplest case by an annular flange which can be brought into contact with an upper end of the guide sleeve 19.

At their end facing away from the guide sleeve 19, the guide pistons 17 are inserted into holes of the guide plate 14 and detachably secured there, for instance by screwing.

Furthermore, the drive means 39 for the various screwing tools 6 are in particular arranged on the transverse carrier 58. In the illustrated embodiment, each screwing tool has assigned thereto a separate drive means. Each screwing tool can thereby be controlled separately with respect to rotational speed and torque.

Each screwing tool 6 is provided with drive shaft 9 and wrench head 10. The drive shaft 9 is motion-connected at one drive end 38 to one respective drive means 39. With an end opposite the drive end 38, the drive shaft 9 is inserted in telescopically displaceable fashion into an inner hole 29 of a wrench head housing 28 of the wrench head 10. At the corresponding insertion end 30 of the wrench head housing 28, the latter comprises a driving means 31 which is formed by a driving flange 34. Said flange is detachably secured to the insertion end 30 by a number of screws, or the like. A rotationally fixed connection between driving flange and insertion end is in particular realized by a claw connection 35; see, in particular, FIG. 5.

The wrench head housing 28 is rotatably supported by means of a double bearing arrangement 21 in the guide plate 14 and displaceably supported in the longitudinal direction of the screwing tools 6. The double bearing arrangement 21 is detachably secured in the guide plate 14. An upper stop ring 27 is arranged below the guide plate 14, in particular on the bottom side 25 thereof. Said ring is attached onto the wrench head housing 28 and secured to the bottom side 25. The upper stop ring 27 and a lower stop ring 26 have arranged therein-between a spring element 22 by which each wrench head housing 28 is spring-biased towards the workpiece 28. The lower stop ring 26 is also attached onto the wrench head housing 28 and held by a retaining ring, or the like; see FIG. 5.

It should here be noted that the two stop rings 26, 27 can also be kept apart solely by the pressure force of the spring element 22, so that a fixed positioning on the wrench head housing 28 is not needed. This means that the stop rings 26, 27 are only protected from slipping downwards towards workpiece 48 and from slipping upwards towards transverse carrier 58 by retaining ring and guide plate 14, respectively.

Figure 4:
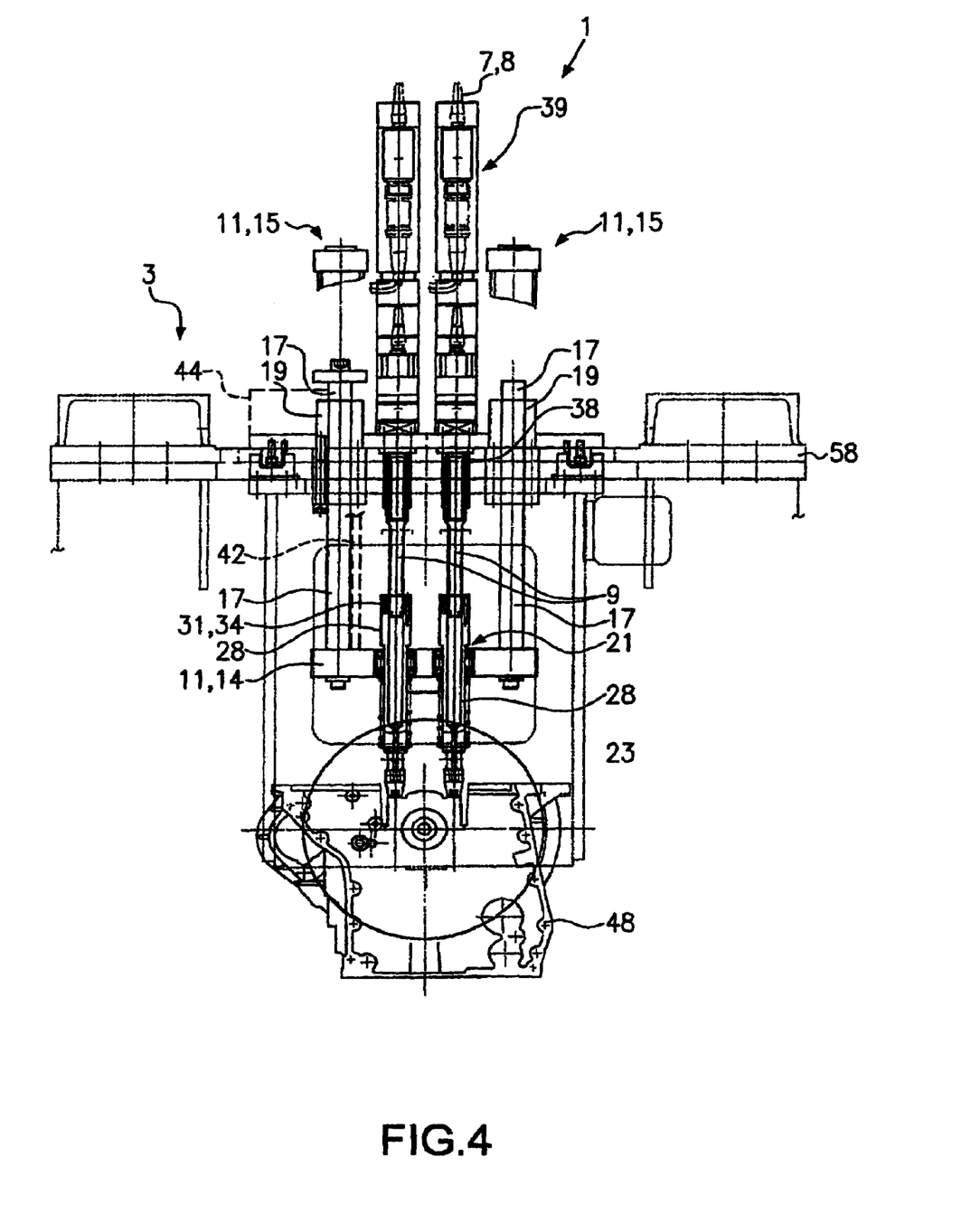
FIG. 4 is a side view of the screwing station according to FIG. 3.

FIG. 4 shows the screwing station 1 according to FIG. 3 in a side view.

In particular, this figure shows two screwing tools of the screwing tools 6 arranged in parallel rows; see FIG. 2. Next to the screwing tools 6, the guide pistons 17 are arranged that extend in parallel with the screwing tools and with one another.

At least one rail-like guide 42 is shown in broken line in FIG. 4 as an alternative guide means 16. Instead of or also in addition to the guide pistons 17, the guide plate 14 is guided between lifted and lowered position by such rail-like guides 42. For fixing the guide plate 14 along such a guide means 16, other adjustment drives 44 are also possible apart from or instead of the lifting and lowering means 11 as piston-cylinder adjustment units 15; see the broken-line illustration above the transverse carrier 58. Such an alternative adjustment drive 44 may be an electric motor with recirculating ball spindle, a belt drive, or the like.

FIG. 4 also shows the guide plate 14 in its lowered position 13 in which the socket wrenches 23 are in engagement with corresponding screw-in means on the workpiece 48.

Figure 5:
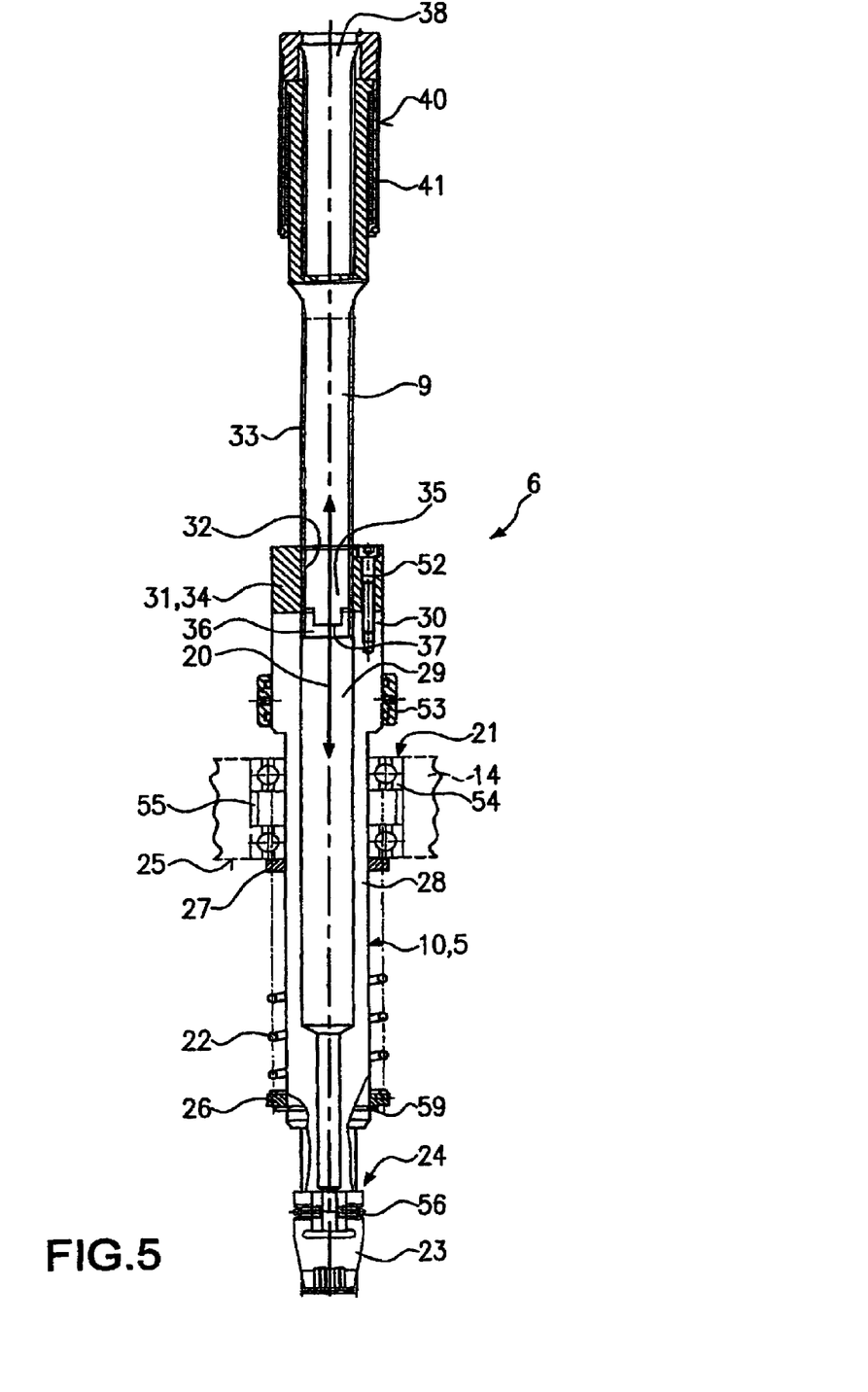
FIG. 5 is an enlarged view of a screwing tool as used in the screwing stations of the preceding figures.

FIG. 5 shows a screwing tool 6 as used in the preceding embodiments, on an enlarged scale.

At the drive end 38 of the drive shaft 9, said shaft has arranged thereon a shell set 40 with spacer sleeve 41. The set serves the purpose of connection to the corresponding drive means 39; see also FIG. 4.

The drive shaft 9 is substantially provided below the spacer sleeve 41 with an external toothing 33 in the form of an external spline toothing. The toothing is in engagement with a corresponding internal toothing of the driving flange 34 as the driving means 31. There is a rotationally fixed coupling between drive shaft 9 and wrench head housing 28 and wrench head 10, respectively, due to the engagement of internal toothing and external toothing.

The driving flange 34 is secured by a number of screw bolts 52 to the insertion end 30 of the wrench head housing 28. The rotationally rigid connection of driving flange 34 and wrench head housing 28 is, in particular, formed by a claw connection 35. Said connection comprises two, three, four or more claws engaging into corresponding claw receiving means 37 at the insertion end 30 of the wrench head housing 28.

In the inner bore 29 of the wrench head housing 28, the drive shaft 9 is supported in a freely displaceable way in longitudinal direction 20. In FIG. 5, the wrench head housing 28 is arranged in its operative position 5, and thus the guide plate 14 in the lowered position 13.

The wrench head housing 28 comprises a lower section of a reduced diameter which extends from a measuring ring 53 to the lower stop ring 26. In this section, the wrench head housing 28 is displaceably supported in the double bearing arrangement 21 in the guide plate 14. The double bearing arrangement 21 is formed by two ball bearings 54 between which a spacer ring 55 is arranged. The double bearing arrangement 21 is detachably secured in the guide plate 14.

The upper stop ring 27 is in contact with the bottom side 25 of the guide plate 14. The spring element 22 is arranged between said upper stop ring and the lower stop ring 26. The spring element keeps the stop rings 26, 27 spaced apart and in contact with the bottom side 25 and a retaining ring 59, respectively, on the wrench head housing 28.

At the work end 24 of the wrench head housing 28, a socket wrench 23 is detachably secured by means of a securing ring 56.

The screwing stations according to the invention have the advantage that substantially only the wrench head housing 28 with socket wrenches 23 and the guide pistons 17 have to be moved as masses and that all of the other means are stationarily arranged on the machine frame 3. This is in particular true for the supply and measuring lines 7, 8; see FIG. 4. The mass of the parts to be moved is thereby considerably reduced during adjustment of the screwing tools 6 between retracted position 4 and operative position 5. During the whole possible movement of the wrench head housing 28, these are connected in rotationally rigid fashion to the associated drive shaft 9 via the corresponding toothings between said shaft and the driving means 31.

The invention claimed is:

1. A screwing station for use along an assembly line, comprising:
    at least one machine frame;
    a powered screwing tool adjustably supported by said machine frame for movement between a retracted position and an operative position;
    a guide plate; and
    at least one guide means arranged between said guide plate and said machine frame;
    wherein said powered screwing tool comprises a drive shaft supported by said machine frame and a wrench head drivingly connected to said drive shaft and telescopically displaceable relative thereto,
    wherein said wrench head is moveable between said retracted position and said operative position by a single lifting and lowering means,
    wherein said single lifting and lowering means is disposed external to said wrench head,
    wherein said guide means comprises at least one guide piston,
    wherein said guide means is arranged between said guide plate and said machine frame, and
    wherein said guide piston is detachably secured to said guide plate and supported in longitudinally displaceable fashion on said machine frame in a guide sleeve.

2. The screwing station according to claim 1, wherein said wrench head is displaceably supported relative to said guide plate substantially in a longitudinal direction of said wrench head, and
    wherein said wrench head is rotatably supported by said guide plate via a double bearing arrangement.

3. The screwing station according to claim 1, wherein said wrench head comprises a free work end, a socket wrench at said free work end, and a spring element substantially attached between said socket wrench and a bottom side of said guide plate.

4. The screwing station according to claim 1, wherein said wrench head comprises a substantially tubular wrench head housing comprising an inner hole telescopically adjustably engaged by said drive shaft,
    wherein said wrench head housing is substantially provided at an insertion end thereof facing said drive shaft with a driving means forming a rotationally fixed connection of said wrench head and said drive shaft, and wherein said driving means comprises an internal spline toothing engaging a corresponding external toothing on said drive shaft.

5. The screwing station according to claim 1, further comprising a shell set comprising a spacer sleeve attached onto a drive end of said drive shaft.

6. The screwing station according to claim 1, wherein said wrench head is moveable relative to said drive shaft between said refracted position and said operative position.

7. The screwing station according to claim 1, wherein said single lifting and lowering means further comprises at least one piston-cylinder adjustment unit arranged between said machine frame and said guide plate.

8. The screwing station according to claim 1, wherein said single lifting and lowering means further comprises at least one piston-cylinder adjustment unit arranged between said machine frame and said guide plate,
wherein said guide plate is adjustably supported on said machine frame between a lifted and a lowered position,
wherein said screwing station further comprises a locking means operative to lock said guide plate in said lifted position, and
wherein said locking means comprises a clamping means of said piston-cylinder adjustment unit.

9. A screwing station for use along an assembly line, comprising:
at least one machine frame;
a powered screwing tool adjustably supported by said machine frame for movement between a refracted position and an operative position; and
a guide plate;
wherein said powered screwing tool comprises a drive shaft supported by said machine frame and a wrench head drivingly connected to said drive shaft and telescopically displaceable relative thereto,
wherein said wrench head is moveable between said retracted position and said operative position by a single lifting and lowering means,
wherein said single lilting and lowering means is disposed external to said wrench head,
wherein said wrench head is displaceably supported relative to said guide plate substantially in a longitudinal direction of said wrench head, and
wherein said wrench head is rotatably supported by said guide plate via a double bearing arrangement.

10. The screwing station according to claim 9, further comprising at least one guide means arranged between said guide plate and said machine frame;
wherein said guide means comprises at least one guide piston, and
wherein said guide piston is detachably secured to said guide plate and longitudinally displaceable on said machine frame.

11. The screwing station according to claim 9, wherein said wrench head comprises a free work end, a socket wrench at said free work end, and a spring element substantially attached between said socket wrench and a bottom side of said guide plate.

12. The screwing station according to claim 9, wherein said wrench head comprises a substantially tubular wrench head housing comprising an inner hole telescopically adjustably engaged by said drive shaft,
wherein said wrench head housing is substantially provided at an insertion end thereof facing said drive shaft with a driving means forming a rotationally fixed connection of said wrench head and said drive shaft, and
wherein said driving means comprises an internal spline tooting engaging a corresponding external toothing on said drive shaft.

13. The screwing station according to claim 9, further comprising a shell set comprising a spacer sleeve attached onto a drive end of said drive shaft.

14. The screwing station according to claim 9, wherein said wrench head comprises a substantially tubular wrench head housing comprising an inner hole telescopically adjustably engaged by said drive shaft.

15. The screwing station according to claim 9, further comprising a displacement drive corresponding to said guide plate, said displacement drive comprising a ball spindle and an electric motor.

16. The screwing station according to claim 9, wherein said wrench head is biased towards said operative position by a spring.

17. A screwing station for use along an assembly line, comprising:
at least one machine frame;
a powered screwing tool adjustably supported by said machine frame for movement between a refracted position and an operative position; and
a guide plate;
wherein said powered screwing tool comprises a drive shaft supported by said machine frame and a wrench head drivingly connected to said drive shaft and telescopically displaceable relative thereto,
wherein said wrench head is moveable between said retracted position and said operative position by a single lifting and lowering means,
wherein said single lifting and lowering means is disposed external to said wrench head, and
wherein said wrench head comprises a free work end, a socket wrench at said free work end, and a spring element substantially attached between said socket wrench and a bottom side of said guide plate.

18. The screwing station according to claim 17, wherein said spring element is arranged between two stop rings attached onto said wrench head.

19. The screwing station according to claim 17, wherein said socket wrench is detachably secured to said free work end.

20. The screwing station according to claim 17, further comprising at least one guide means arranged between said guide plate and said machine frame;
wherein said guide means comprises at least one guide piston, and
wherein said guide piston is detachably secured to said guide plate and longitudinally displaceable on said machine frame.

21. The screwing station according to claim 17, wherein said wrench head is displaceably supported relative to said guide plate substantially in a longitudinal direction of said wrench head, and
wherein said wrench head is rotatably supported by said guide plate via a double bearing arrangement.

22. The screwing station according to claim 17, wherein said wrench head comprises a substantially tubular wrench head housing comprising an inner hole telescopically adjustably engaged by said drive shaft,
wherein said wrench head housing is substantially provided at an insertion end thereof facing said drive shaft with a driving means forming a rotationally fixed connection of said wrench head and said drive shaft, and wherein said driving means comprises an internal spline toothing engaging a corresponding external tooting on said drive shaft.

23. The screwing station according to claim 17, further comprising a shell set comprising a spacer sleeve attached onto a drive end of said drive shaft.

24. The screwing station according to claim 17, wherein said wrench head drivingly connects to said drive shaft when said wrench head is telescopically extended.

25. The screwing station according to claim 17, wherein said wrench head remains drivingly connected to said drive shaft throughout telescopic displacement of said drive shaft.

26. A screwing station for use along an assembly line, comprising:
at least one machine frame; and
a powered screwing tool adjustably supported by said machine frame for movement between a retracted position and an operative position;
wherein said powered screwing tool comprises a drive shaft supported by said machine frame and a wrench head drivingly connected to said drive shaft and telescopically displaceable relative thereto,
wherein said wrench head is moveable between said refracted position and said operative position by a single lifting and lowering means,
wherein said single lifting and lowering means is disposed external to said wrench head,
wherein said wrench head comprises a substantially tubular wrench head housing with an inner hole which is engaged by said drive shaft in telescopically adjustable fashion,
wherein said wrench head housing is substantially provided at an insertion end thereof facing said drive shaft with a driving means forming a rotationally fixed connection of said wrench head and said drive shaft, and
wherein said driving means comprises an internal spline toothing engaging a corresponding external tooting on said drive shaft.

27. The screwing station according to claim 26, further comprising a guide plate.

28. The screwing station according to claim 27, further comprising at least one guide means arranged between said guide plate and said machine frame;
wherein said guide means comprises at least one guide piston, and
wherein said guide piston is detachably secured to said guide plate and longitudinally displaceable on said machine frame.

29. The screwing station according to claim 27, wherein said wrench head is displaceably supported relative to said guide plate substantially in a longitudinal direction of said wrench head, and
wherein said wrench head is rotatably supported by said guide plate via a double bearing arrangement.

30. The screwing station according to claim 27, wherein said wrench head comprises a free work end, a socket wrench at said free work end, and a spring element substantially attached between said socket wrench and a bottom side of said guide plate.

31. The screwing station according to claim 27, wherein said guide plate is adjustably supported on said machine frame between a lifted and a lowered position, and wherein said screwing station further comprises guides on said machine frame configured to guide said guide plate between said lifted position and said lowered position.

32. The screwing station according to claim 27, wherein said guide plate is adjustably supported on said machine frame between a lifted and a lowered position, and
wherein said screwing station further comprises a locking means operative to lock said guide plate in said lifted position.

33. The screwing station according to claim 26, further comprising a shell set comprising a spacer sleeve attached onto a drive end of said drive shaft.

34. A screwing station for use along an assembly line, comprising:
at least one machine frame;
a powered screwing tool adjustably supported by said machine frame for movement between a retracted position and an operative position; and
a shell set;
wherein said powered screwing tool comprises a drive shaft supported by said machine frame and a wrench head drivingly connected to said drive shaft and telescopically displaceable relative thereto,
wherein said wrench head is moveable between said retracted position and said operative position by a single lifting and lowering means,
wherein said single lifting and lowering means is disposed external to said wrench head, and
wherein said shell set comprises a spacer sleeve attached onto a drive end of said drive shaft.

35. The screwing station according to claim 34, further comprising a guide plate.

36. The screwing station according to claim 35, further comprising at least one guide means arranged between said guide plate and said machine frame;
wherein said guide means comprises at least one guide piston, and
wherein said guide piston is detachably secured to said guide plate and longitudinally displaceable on said machine frame.

37. The screwing station according to claim 35, wherein said wrench head is displaceably supported relative to said guide plate substantially in a longitudinal direction of said wrench head, and
wherein said wrench head is rotatably supported by said guide plate via a double bearing arrangement.

38. The screwing station according to claim 35, wherein said wrench head comprises a free work end, a socket wrench at said free work end, and a spring element substantially attached between said socket wrench and a bottom side of said guide plate.

39. The screwing station according to claim 34, wherein said wrench head comprises a substantially tubular wrench head housing comprising an inner hole telescopically adjustably engaged by said drive shaft,
wherein said wrench head housing is substantially provided at an insertion end thereof facing said drive shaft with a driving means forming a rotationally fixed connection of said wrench head and said drive shaft, and
wherein said driving means comprises an internal spline toothing engaging a corresponding external tooting on said drive shaft.

* * * * *